United States Patent
Hoshina et al.

(10) Patent No.: US 9,159,997 B2
(45) Date of Patent: *Oct. 13, 2015

(54) NONAQUEOUS ELECTROLYTE BATTERY, ELECTRODE FOR THE SAME, AND BATTERY PACK

(75) Inventors: Keigo Hoshina, Yokohama (JP); Takuya Iwasaki, Uenohara (JP); Tetsuya Sasakawa, Yokohama (JP); Hiroki Inagaki, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,863

(22) Filed: Jun. 29, 2012

(65) Prior Publication Data

US 2013/0115508 A1   May 9, 2013

(30) Foreign Application Priority Data

Sep. 20, 2011   (JP) .................................. 2011-205304

(51) Int. Cl.
| | |
|---|---|
| *H01M 4/485* | (2010.01) |
| *H01M 4/36* | (2006.01) |
| *H01M 4/131* | (2010.01) |

(Continued)

(52) U.S. Cl.
CPC .............. *H01M 4/485* (2013.01); *C01G 23/005* (2013.01); *H01M 4/131* (2013.01); *H01M 4/483* (2013.01); *H01M 4/622* (2013.01); *H01M 10/0525* (2013.01); *C01P 2002/72* (2013.01); *C01P 2006/12* (2013.01); *C01P 2006/40* (2013.01); *H01M 2004/021* (2013.01); *H01M 2004/027* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2006/0046155 A1* | 3/2006 | Inagaki et al. ................. | 429/332 |
| 2007/0072080 A1* | 3/2007 | Inagaki et al. ............. | 429/231.1 |

(Continued)

FOREIGN PATENT DOCUMENTS

| | | |
|---|---|---|
| JP | 2008-542979 A | 11/2008 |
| JP | 2009-117259 | 5/2009 |

(Continued)

OTHER PUBLICATIONS

Graham Armstrong, et al., "TiO$_2$(B) Nanotubes as Negative Electrodes for Rechargeable Lithium Batteries", Electrochemical and Solid-State Letters, 9 (3), 2006, pp. A139-A143.

(Continued)

*Primary Examiner* — Cynthia K Walls
(74) *Attorney, Agent, or Firm* — Oblon, McClelland, Maier & Neustadt, L.L.P.

(57) ABSTRACT

According to one embodiment, there is provided an electrode for a nonaqueous electrolyte battery. The electrode includes an active material layer. The active material layer includes a monoclinic β-type titanium composite oxide. When the electrode is subjected to an X-ray diffraction measurement using a Cu-Kα ray source, a ratio of a reflection intensity I(020) of a peak derived from a plane (020) of a crystal of the monoclinic β-type titanium composite oxide to a reflection intensity I(001) of a peak derived from a plane (001) of the crystal of the monoclinic β-type titanium composite oxide being in the range from 0.6 to 1.2.

13 Claims, 5 Drawing Sheets

(51) Int. Cl.
*C01G 23/00* (2006.01)
*H01M 4/48* (2010.01)
*H01M 4/62* (2006.01)
*H01M 10/0525* (2010.01)
*H01M 4/02* (2006.01)

(56) References Cited

U.S. PATENT DOCUMENTS

| | | | |
|---|---|---|---|
| 2009/0035662 A1* | 2/2009 | Scott et al. | 429/231.5 |
| 2011/0206991 A1 | 8/2011 | Nakahara et al. | |
| 2012/0129015 A1 | 5/2012 | Inagaki et al. | |
| 2012/0183839 A1 | 7/2012 | Yuasa et al. | |

FOREIGN PATENT DOCUMENTS

| | | |
|---|---|---|
| JP | 2010-123424 | 6/2010 |
| JP | 2011-76820 A | 4/2011 |
| JP | 2011-81931 A | 4/2011 |
| JP | 2011-90794 A | 5/2011 |
| WO | WO2009/028530 | 3/2009 |
| WO | WO 2010/137156 | 12/2010 |
| WO | WO 2011/010371 A1 | 1/2011 |
| WO | WO 2011/136258 A1 | 11/2011 |

OTHER PUBLICATIONS

Rene Marchand, et al., "TiO$_2$(B) a New Form of Titanium Dioxide and the Potassium Octatitanate K$_2$Ti$_8$O$_{18}$", Material Research Bulletin, vol. 15, 1980, pp. 1129-1133.

The Extended European Search Report issued Jan. 2, 2013, in Application No. / Patent No. 12173800.9-2119.

Korean Office Action issued Dec. 24, 2013 in Patent Application No. 10-2012-0070451 with English Translation.

Office Action issued Jan. 6, 2015, in corresponding Japanese Patent Application No. 2014-084351, (with English-language Translation).

Chinese Office Action issued Apr. 22, 2015, in corresponding Chinese Patent Application No. 201210251233.X (with English-language Translation).

* cited by examiner

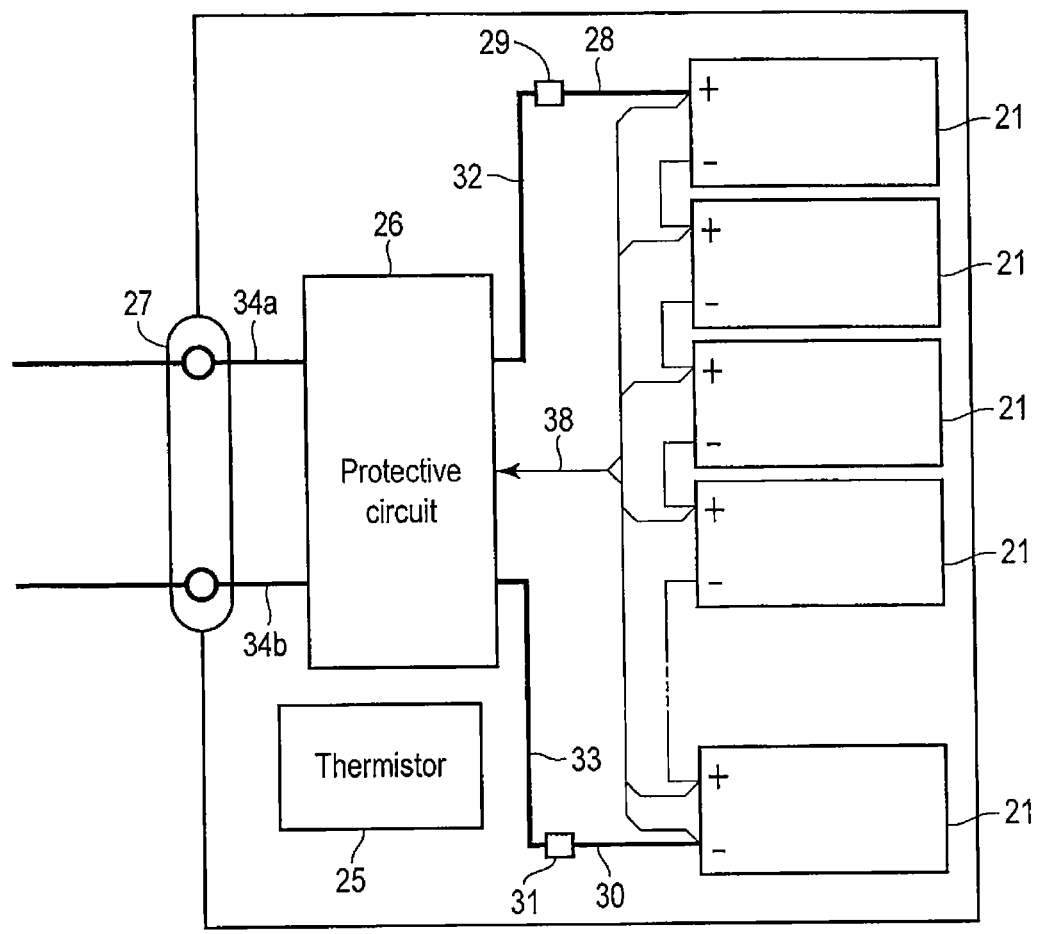
F I G. 5

NONAQUEOUS ELECTROLYTE BATTERY, ELECTRODE FOR THE SAME, AND BATTERY PACK

CROSS-REFERENCE TO RELATED APPLICATIONS

This application is based upon and claims the benefit of priority from prior Japanese Patent Application No. 2011-205304, filed Sep. 20, 2011, the entire contents of which are incorporated herein by reference.

FIELD

Embodiments described herein relate generally to a nonaqueous electrolyte battery, an electrode for the battery, and a battery pack.

BACKGROUND

Titanium oxide having a monoclinic β-type structure has been developed as a negative electrode material for nonaqueous electrolyte battery such as a lithium-ion secondary battery. An electrode using titanium oxide having a monoclinic β-type structure has a theoretical capacity as high as about 330 mAh/g. On the other hand, the theoretical capacity of the conventionally-used electrode using lithium titanate having a spinel structure ($Li_4Ti_5O_{12}$) is about 170 mAh/g. Then, it seems that a battery which has significantly higher capacity than that of the conventional battery can be developed by using a titanium oxide having a monoclinic β-type structure. However, a nonaqueous electrolyte battery using titanium oxide having a monoclinic β-type structure has low input-output property.

BRIEF DESCRIPTION OF THE DRAWINGS

FIG. 5 is a block diagram showing an electric circuit of the battery pack of FIG. 4;

DETAILED DESCRIPTION

In general, according to one embodiment, there is provided an electrode for nonaqueous electrolyte battery. The battery comprises a current collector and an active material layer provided on the current collector. The active material layer comprises a monoclinic β-type titanium composite oxide. When the electrode is subjected to an X-ray diffraction measurement using a Cu-Kα ray source, a ratio of a reflection intensity I(020) of a peak derived from a plane (020) of the crystal of the monoclinic β-type titanium composite oxide to a reflection intensity I(001) of a peak derived from a plane (001) of the crystal of the monoclinic β-type titanium composite oxide is in the range from 0.6 to 1.2.

(First Embodiment)

Figure 1:
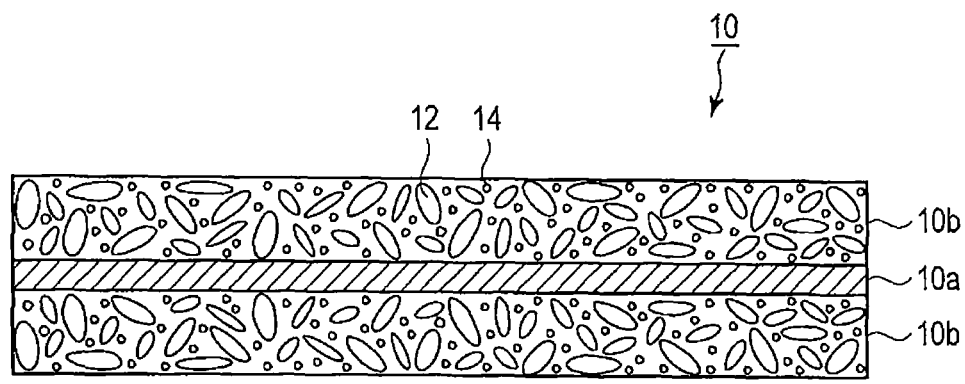
FIG. 1 is a schematic cross-sectional view of an electrode according to a first embodiment.

FIG. 1 shows an example of an electrode for nonaqueous electrolyte battery according to a first embodiment. FIG. 1 is schematic cross-sectional view of the electrode.

An electrode 10 comprises a current collector 10a and an active material layer 10b. The active material layer 10b is provided on the both surfaces of the current collector 10a. The active material layer 10b comprises an active material 12, a conductive agent 14, and a binder (not shown). The active material layer 10b may be provided only on one surface of the current collector 10a. The active material layer 10b may not comprise the conductive agent 14 and the binder.

As the active material 12, a monoclinic β-type titanium composite oxide is used. Here, the term "monoclinic β-type titanium composite oxide" means a titanium composite oxide having a crystal structure of monoclinic titanium dioxide. The crystal structure of monoclinic titanium dioxide mainly belongs to a space group C2/m and has a tunnel structure. For details of the crystal structure of monoclinic titanium dioxide, refer to G. Armstrong, A. R. Armstrong, J. Canales, P. G. Bruce, Electrochem. Solid-State Lett., 9, A139 (2006).

When the electrode 10 is subjected to the measurement with the powder X-ray diffraction method (XRD) using a Cu-Kα ray source, the ratio of a reflection intensity I(020) of a peak derived from a plane (020) of the crystal of the monoclinic β-type titanium composite oxide to a reflection intensity I(001) of a peak derived from a plane (001) of the crystal of the monoclinic β-type titanium composite oxide is in the range from 0.6 to 1.2. Hereinafter, such a ratio is referred to as "the ratio I(020)/I(001)".

In the XRD pattern, the peak derived from the plane (020) of the crystal appears in the vicinity of 2θ=48.5°. Here, the term "vicinity of 2θ=48.5°" intends to mean 2θ=48.5°±0.5°. In the case, a range of 2θ is from 48° to 49°.

In the XRD pattern, the peak derived from the plane (001) of the crystal appears in the vicinity of 2θ=14.3°. Here, the term "vicinity of 2θ=14.3°" intends to mean 2θ=14.3°±0.5°. In the case, a range of 2θ is from 13.8° to 14.8°.

When the ratio I(020)/I(001) is within the above range, the electrode show a superior input-output property.

In the crystal of the monoclinic β-type titanium composite oxide, lithium ion moves in a direction perpendicular to the plane (020). Therefore, the plane (020) is advantageous to insertion and release of lithium ion. Thus, input-output property of the electrode can be improved by increasing the plane (020) in the state that it is parallel to the surface of the electrode. As the plane (020) being parallel to the surface of the electrode increases, the reflection intensity I(020) becomes large. As a result, the ratio I(020)/I(001) becomes large. Accordingly, when the ratio I(020)/I(001) is large, the electrode shows good input-output property.

When the ratio I(020)/I(001) is less than 0.6, the input-output property of the electrode is inferior. In the electrode having a ratio I(020)/I(001) less than 0.6, there are not many plane (020) in the state that it is parallel to the surface of the electrode. Thus, lithium ion does not easily insert into the crystal of the monoclinic β-type titanium composite oxide. Therefore, it is considered that the internal resistance increases and input-output property deteriorates.

The upper limit of the ratio I(020)/I(001) is not theoretically limited. However, when the ratio I(020)/I(001) is too high, the density of the active material layer is decreased, as described later. Therefore, the energy density of the electrode decreases. Further, when the density of the active material layer is too low, the active material is hard to contact with the conductive agent. As a result, input-output property deteriorates. Thus, the ratio I(020)/I(001) is preferably 1.5 or less, and more preferably 1.2 or less.

The electrode can be produced by, for example, the following method. First, an active material, a conductive agent, and a binder are suspended in a solvent to prepare a slurry. The slurry is applied to one or both surfaces of the current collector, followed by drying to form an active material layer. Then, the resultant layer is pressed. Alternatively, a pellet is formed from the active material, the conductive agent, and the binder. The pellet is used as the electrode layer on the current collector.

The value of the ratio I(020)/I(001) can be adjusted by changing the pressure during the press treatment. The primary particle of the monoclinic β-type titanium composite oxide generally has a fibrous shape. The plane (020) is the plane which is perpendicular to the direction of the fiber length. If the pressure during the press treatment is too large, the density of the active material layer 10b is excessively increased. In this case, the fiber of the primary particle is easily oriented in the state that the fiber length is parallel to the surface of the electrode. That is, if the press pressure is too large, the plane (020) which is parallel to the surface of the electrode is decreased. Therefore, the reflection intensity I(020) is decreased and also the ratio I(020)/I(001) is decreased. On the other hand, if the press pressure is too low, the plane (020) which is parallel to the surface of the electrode is increased. Thus, the reflection intensity I(020) is increased and also the ratio I(020)/I(001) is increased. However, when the press pressure is too low, the density of the active material layer 10b is decreased. Therefore, the energy density of the electrode is decreased.

According to the embodiment, the ratio I(020)/I(001) can be made within the above range by performing the press treatment with an appropriate press pressure. As a result, the input-output property can be improved.

It is also possible to adjust the ratio I(020)/I(001) by using the crystal of the monoclinic β-type titanium composite oxide having mainly the plane (020) for the production of the electrode.

The density of the active material layer 10b after the press treatment is preferably in the range 2.0 g/cm³ to 2.5 g/cm³. When the density of the active material layer is 2.0 g/cm³ or more, the energy density of the electrode can be ensured. Therefore, the effect of increased capacity by using the monoclinic β-type titanium composite oxide can be obtained. When the density of the active material layer is 2.5 g/cm³ or less, the ratio I(020)/I(001) can be made 0.6 or more. Also, in the case, a sufficient amount of the electrolytic solution is immersed in the electrode. Therefore, the input-output property (rate properties) can be improved.

The binder contained in the active material layer is used to bind the active material to the conductive agent. Examples of the binder include polytetrafluoroethylene (PTFE), polyvinylidene fluoride (PVdF), fluorine-based rubber, and styrene butadiene rubber. It is more preferable that the electrode in this embodiment comprises a styrene butadiene rubber as the binder. The styrene butadiene rubber is more flexible compared with polyvinylidene fluoride (PVDF) and the like. Thus, the density of the active material layer can be increased without making the particles of the monoclinic β-type titanium composite oxide be oriented unidirectionally by using the styrene butadiene rubber. Therefore, the density of the active material layer can be increased without changing the ratio I(020)/I(001) largely by using the styrene butadiene rubber.

The conductive agent contained in the active material layer is used to improve the current collection performance and suppress the contact resistance with the current collector. Examples of the conductive agent include acetylene black, carbon black, and graphite. A scale-shaped graphite is preferably used because the density of the active material layer can be increased without making the particles of the monoclinic β-type titanium composite oxide be oriented unidirectionally. Therefore, by using the scale-shaped graphite, the density of the active material layer can be increased without changing the ratio I(020)/I(001) largely.

The monoclinic β-type titanium composite oxide preferably has a specific surface area in the range from $5\,m^2/g$ to $100\,m^2/g$. When the specific surface area is $5\,m^2/g$ or more, the sites for lithium ions to be insertion and release can be sufficiently ensured and a high capacity can be obtained. When the specific surface area is $100\,m^2/g$ or less, a decrease in the coulomb efficiency during charge and discharge can be suppressed. The specific surface area is more preferably in the range from $10\,m^2/g$ to $20\,m^2/g$. The specific surface area can be measured by, for example, a BET method.

The average particle diameter of the agglomerated particle of the monoclinic β-type titanium composite oxide is preferably in the range from 5 μm to 20 μm. Here, the term "average particle diameter" means $D_{50}$ (i.e., a cumulative total of 50% in particle size distribution results), as used in a laser diffraction-type particle size distribution measuring method. When the average particle diameter is 5 μm or more and 20 μm or less, the excessive side reactions on the surface of the particles can be suppressed. Further, when the average particle diameter is in the above range, the slurry and the electrode are easily produced.

(Measurement of the Density of the Active Material Layer)

The measurement method of the density of the active material layer will be described. The electrode is first punched into a size of 2 cm×2 cm and the mass is measured. The mass of the electrode is calculated by subtracting the mass of current collection foil from the mass of the electrode, and the mass of the electrode per unit area (g/cm²) is calculated. The thickness of the electrode is measured at five points by a film thickness meter. The average electrode thickness is calculated from the arithmetic average of the five points. The density of the active material layer is calculated from the mass of the electrode per unit area and the average electrode thickness. When the electrode taken out from the battery is measured, the electrode is washed with a methylethyl carbonate solvent and dried sufficiently, and then, mass and thickness of electrode is measured.

(XRD Measurement)

The XRD measurement method will be described. First, a target electrode is attached to a glass sample plate using, for example, a double-sided tape. At this time, care must be taken not to come off the electrode. If necessary, the electrode may be cut into an appropriate size to attach to the glass sample plate. In order to correct the peak position, a Si standard sample may be placed on the electrode. Subsequently, the glass plate to which the electrode is attached is placed in a powder X-ray diffractometer and the diffraction patterns are acquired using Cu-Kα rays.

(Monoclinic β-Type Titanium Composite Oxide)

The monoclinic β-type titanium composite oxide can be synthesized by subjecting alkali titanate compounds such as $Na_2Ti_3O_7$, $K_2Ti_4O_9$, or $Cs_2Ti_5O_{11}$ to a proton exchange in order to exchange those alkali metals for protons and to obtain a proton-exchanged compound, and heat-treating the proton-exchanged compound.

The monoclinic β-type titanium composite oxide may contain alkali metals such as Na, K, or Cs, which are left after the proton exchange. However, the content of these alkali metals is preferably low. The content is preferably 2% by mass or less, more preferably 1% by mass or less based on the monoclinic β-type titanium composite oxide.

According to the above embodiment, there can be provided an electrode which can realize a nonaqueous electrolyte battery having improved input-output property.

(Second Embodiment)

The nonaqueous electrolyte secondary battery of this embodiment will be described with reference to the drawings. The same reference numerals denote common portions throughout the embodiments and overlapped description is not repeated. Each drawing is a pattern diagram to facilitate the description of the embodiments and its understanding. The shape, size, and ratio thereof are different from those of an actual device. However, they can be appropriately designed and modified by taking into consideration the following description and known techniques.

Figure 2:
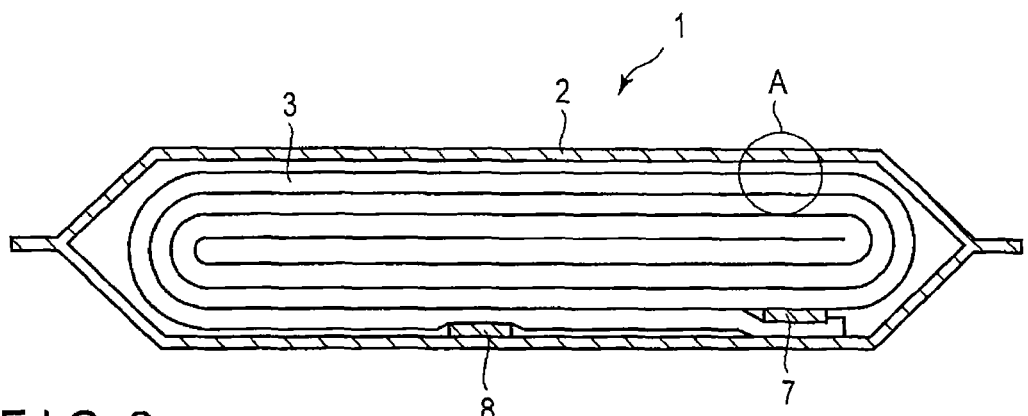
FIG. 2 is a schematic cross-sectional view of a nonaqueous electrolyte secondary battery according to a second embodiment.
Figure 3:
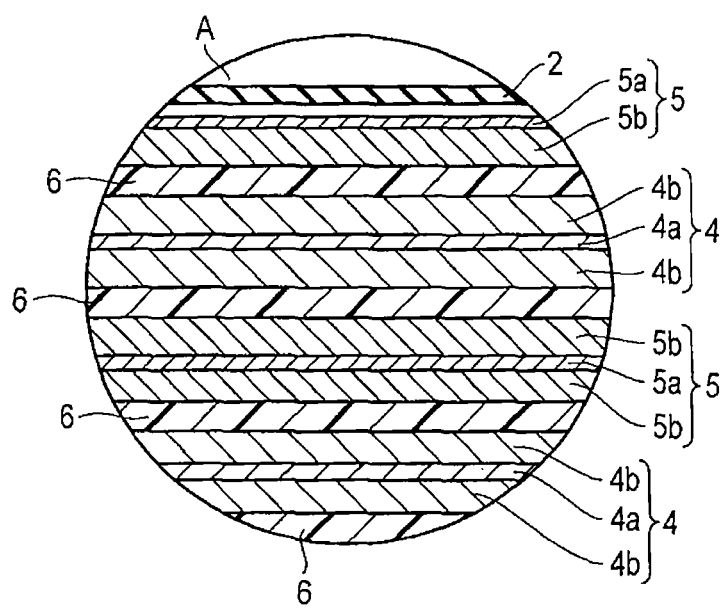
FIG. 3 is an enlarged sectional view of a portion A of FIG. 2.

FIG. 2 shows an example of the nonaqueous electrolyte battery. FIG. 2 is a cross-sectional diagram of a flat-type nonaqueous electrolyte secondary battery. FIG. 3 is an enlarged sectional view of a portion A in FIG. 2.

A battery 1 comprises a container 2, a wound electrode group 3 with a flat shape, a positive electrode terminal 7, a negative electrode terminal 8, and a nonaqueous electrolyte.

The container 2 has baggy shape. The container 2 is made of a laminate film. The wound electrode group 3 is accommodated in the container 2. The wound electrode group 3 comprises a positive electrode 4, a negative electrode 5, and a separator 6 as shown in FIG. 3. The wound electrode group 3 is formed by spirally winding a laminated product obtained by laminating the negative electrode 5, the separator 6, the positive electrode 4, and the separator 6 in this order from the outside and press molding the resultant product.

The positive electrode 4 comprises a positive electrode current collector 4a and a positive electrode active material layer 4b. The positive electrode active material layer 4b comprises the positive electrode active material and optionally the conductive agent and the binder. The positive electrode active material layer 4b is provided on each surface of the positive electrode current collector 4a. The positive electrode active material layer 4b may be provided only on one surface of the positive electrode current collector 4a.

The negative electrode 5 comprises a negative electrode current collector 5a and a negative electrode active material layer 5b. The negative electrode active material layer 5b comprises a negative electrode active material and optionally the conductive agent and the binder. In the outermost negative electrode 5, the negative electrode active material layer 5b is provided on the only inner surface of the negative electrode current collector 5a. In other portions, the negative electrode active material layer 5b is provided on both surface of the negative electrode current collector 5a. The negative electrode active material layer 5b may be provided only on one surface of the negative electrode current collector 5a.

As shown in FIG. 2, near the peripheral edge of the wound electrode group 3, the band-shaped positive electrode terminal 7 is connected to the positive electrode current collector 4a. The band-shaped negative electrode terminal 8 is connected to the negative electrode current collector 5a at the outermost layer of the wound electrode group. The positive electrode terminal 7 and the negative electrode terminal 8 are extended to outside through an opening of the container 2.

Further, the nonaqueous electrolyte is injected into the container 2. The opening of the container 2 is heat-sealed in a state that the positive electrode terminal 7 and the negative electrode terminal 8 are sandwiched, thereby the wound electrode group 3 and the nonaqueous electrolyte are completely sealed.

In the nonaqueous electrolyte battery 1 in this embodiment, the electrode according to the first embodiment is used as the negative electrode 5. As the negative electrode active material, the monoclinic β-type titanium composite oxide is used. The negative electrode active material may further comprises other titanium-containing oxides such as lithium titanate having a spinel structure and lithium titanate having a ramsdellite structure.

The compounding ratio of the negative electrode active material, the negative electrode conductive agent, and the binder is preferably from 70% by mass to 96% by mass, from 2% by mass to 28% by mass, from 2% by mass to 28 by mass, respectively. When the amount of the negative electrode conductive agent is less than 2% by mass, the current collection performance of the negative electrode active material layer is lowered and large current performance of the nonaqueous electrolyte secondary battery may be reduced. When the content of the binder is less than 2% by mass, the binding property of the negative electrode active material layer and the negative electrode current collector is lowered and cycle performance may be reduced. On the other hand, from the viewpoint of high capacity performance, each contents of the negative electrode conductive agent and the binder is preferably 28% by mass.

The negative electrode current collector 5a is preferably made of aluminum foil or aluminum alloy foil that is electrochemically stable in a potential range higher than 1.0 V. The aluminum alloy foil preferably contains at least one element selected from the group consisting of Mg, Ti, Zn, Mn, Fe, Cu, and Si.

The negative electrode can be produced by, for example, the following method. First, a negative electrode active material, a conductive agent, and a binder are suspended in a solvent to prepare slurry. The slurry is applied to one or both surfaces of a negative electrode current collector, followed by drying to form a negative electrode active material layer. Thereafter, the resultant layer is pressed. Alternatively, a pellet is formed from the negative electrode active material, the conductive agent, and the binder. The pellet is used as the negative electrode layer.

The negative electrode terminal 8 is made of, for example, a material having conductivity and electric stability in a potential range of 1.0 to 3.0 V (vs Li/Li$^+$). Specifically, examples of these materials include aluminum and aluminum alloys containing element such as Mg, Ti, Zn, Mn, Fe, Cu, or Si. The negative electrode terminal is preferably made of the same material as the negative electrode current collector to reduce the contact resistance with the negative electrode current collector.

As the positive electrode active material, various oxides, sulfides, and polymers can be used.

Examples of the oxides include compounds into which lithium ion can be inserted, for example, manganese dioxide ($MnO_2$), iron oxide, copper oxide and nickel oxide, lithium manganese composite oxides (e.g., $Li_xMn_2O_4$ or $Li_xMnO_2$), lithium nickel composite oxides (e.g., $Li_xNiO_2$), lithium cobalt composite oxides ($Li_xCoO_2$), lithium nickel cobalt composite oxides (e.g., $LiNi_{1-y}Co_yO_2$), lithium manganese cobalt composite oxides (e.g., $LiMn_yCo_{1-y}O_2$), lithium nickel cobalt manganese composite oxides (e.g., $LiNi_{1-y-z}Co_yMn_zO_2$), lithium nickel cobalt aluminum composite oxides (e.g., $LiNi_{1-y-z}Co_yAl_zO_2$), lithium-manganese-nickel composite oxides having a spinel structure (e.g., $Li_xMn_{2-y}Ni_yO_4$), lithium phosphorus oxides having an olivine structure (e.g., $Li_xFePO_4$, $Li_xFe_{1-y}Mn_yPO_4$, $Li_xCoPO_4$), iron sulfate ($Fe_2(SO_4)_3$), and a vanadium oxide (e.g., $V_2O_5$). In the formula above, x, y and z preferably satisfy the relationship represented by the inequality $0<x\le1$, $0\le y\le1$, and $0\le z\le1$, respectively.

The above-described compounds can be used alone or in combination therewith.

Organic materials and inorganic materials, for examples, conductive polymer materials such as polyaniline or polypyrrole; disulfide-based polymer materials; sulfur (S); and carbon fluoride can be used as the positive electrode active material.

As the positive electrode active material, the above-described compounds can be used alone or in combination therewith.

An active material providing a high positive electrode voltage is more preferred. Examples thereof include lithium manganese composite oxides ($Li_xMn_2O_4$), lithium manganese nickel composite oxides having a spinel structure ($Li_xMn_{2-y}Ni_yO_4$), lithium nickel composite oxides ($Li_xNiO_2$), lithium cobalt composite oxides ($Li_xCoO_2$), lithium nickel cobalt composite oxides ($Li_xNi_{1-y}Co_yO_2$), lithium manganese cobalt composite oxides ($Li_xMn_yCo_{1-y}O_2$), lithium nickel cobalt manganese composite oxides (e.g., $LiNi_{1-y-z}Co_yMn_zO_2$), and lithium iron phosphate ($Li_xFePO_4$). In the formula above, x and y preferably satisfy the relationship represented by the inequality $0<x\le1$, $0\le y\le1$, and $0\le z\le1$.

The conductive agent is used to improve the current collection performance and suppress the contact resistance between the active material and the current collector. Examples of the conductive agent include carbonaceous materials such as acetylene black, carbon black, graphite, a carbon nano fiber, and a carbon nanotube.

The binder is used to bind the active material, the conductive agent, and the current collector with each other. Examples of the binder include polytetrafluoroethylene (PTFE), polyvinylidene fluoride (PVdF), and fluorine-based rubber.

The compounding ratio of the positive electrode active material, the conductive agent, and the binder is preferably from 80% by mass to 95% by mass, from 3% by mass to 18% by mass, and from 2% by mass to 17% by mass, respectively.

When the content of the conductive agent is 3% by mass or more, the above effects can be exerted. When the content is 18% by mass or less, decomposition of the nonaqueous electrolyte on the surface of the conductive agent under high temperature storage can be reduced.

When the content of the binder is 2% by mass or more, sufficient electrode strength is obtained. When the content is 17% by mass or less, the blending amount of the insulator of the electrode can be decreased and the internal resistance can be reduced.

The positive electrode current collector 4a is preferably made of an aluminum foil or an aluminum alloy foil containing at least one element selected from Mg, Ti, Zn, Mn, Fe, Cu, or Si.

The positive electrode can be produced by, for example, the following method. First, a positive electrode active material, a conductive agent, and a binder are suspended in a solvent to prepare slurry. The slurry is applied to one or both surfaces of a positive electrode current collector, followed by drying to form a positive electrode layer. Thereafter, the resultant layer is pressed. Alternatively, a pellet is formed from the positive electrode active material, the conductive agent, and the binder. The pellet is used as the positive electrode layer.

The positive electrode terminal 7 is made of a material having conductivity and electric stability in a potential range of 3.0 to 4.5 V (vs $Li/Li^+$). Specifically, examples of these materials include aluminum and aluminum alloys containing element such as Mg, Ti, Zn, Mn, Fe, Cu, or Si. The positive electrode terminal is preferably made of the same material as the positive electrode current collector to reduce the contact resistance with the positive electrode current collector.

As the nonaqueous electrolyte, a liquid nonaqueous electrolyte or gel-like nonaqueous electrolyte can be used. The liquid nonaqueous electrolyte can be prepared by dissolving an electrolyte in an organic solvent. The concentration of the electrolyte is preferably from 0.5 to 2.5 mol/l. The gel-like nonaqueous electrolyte can be prepared by forming a composite of a liquid electrolyte and a polymer material.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), or bistrifluoromethylsulfonylimide lithium [$LiN(CF_3SO_2)_2$]. These electrolytes can be used alone or in combinations of two or more. The electrolyte preferably contains $LiN(CF_3SO_2)_2$.

Examples of the organic solvent include cyclic carbonates such as propylene carbonate (PC), ethylene carbonate (EC), or vinylene carbonate; linear carbonates such as diethyl carbonate (DEC), dimethyl carbonate (DMC), or methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoethane (DEE); and γ-butyrolactone (GBL), acetonitrile (AN), and sulfolane (SL). These organic solvents can be used singly or in combinations of two or more.

Examples of a more preferable organic solvent include a mixed solvent containing two or more kinds selected from the group consisting of propylene carbonate (PC), ethylene carbonate (EC), diethyl carbonate (DEC), dimethyl carbonate (DMC) and methylethyl carbonate (MEC); and a mixed solvent containing γ-butyrolactone (GBL). A nonaqueous electrolyte battery using such a mixed solvent shows excellent properties in low-temperature.

Examples of the polymer material include polyvinylidene fluoride (PVdF), polyacrylonitrile (PAN), and polyethylene oxide (PEO).

As the separator, a porous film made from materials such as polyethylene, polypropylene, cellulose, or polyvinylidene fluoride (PVdF), a synthetic resin nonwoven fabric or the like can be used. A porous film made of polyethylene or polypropylene melts at a certain temperature and can block electric current, and thus it is preferred from the viewpoint of improvement in safety.

As the container, a baggy container formed of a laminate film or a metal container is used.

Examples of the shape of the container include a flat type (thin type), angular type, cylinder type, coin type, button type, sheet-type, and lamination-type shapes. The container having a size corresponding to the dimensions of a battery are used. For example, container for small-sized battery to be mounted on portable electronic device and container for large-sized battery to be mounted on, for example, two- to four-wheel vehicles are also used.

As the laminate film, a multilayer film prepared by interposing a metal layer between resin layers may be used. The metal layer is preferably formed of an aluminum foil or aluminum alloy foil to reduce the weight of the battery. Polymer materials such as polypropylene (PP), polyethylene (PE), nylon or polyethylene terephthalate (PET) may be used for the resin layer. The laminate film can be molded into a desired shape by sealing through thermal fusion. The thickness of the laminate film is preferably 0.2 mm or less.

The metal container may be made of aluminum, an aluminum alloy or the like. The aluminum alloy is preferably contains at least one element selected from Mg, Zn, or Si. When the alloy contains transition metal such as Fe, Cu, Ni or Cr, the amount of the transition metals is preferably 1% by mass or less. Thus, the long-term reliability under the high temperature and heat releasing property can be dramatically improved. A metal plate composing the metal container preferably has a thickness of 0.5 mm or less, more preferably 0.2 mm or less.

According to the above embodiment, there can be provided a nonaqueous electrolyte battery having improved input-output property.

(Third Embodiment)

Subsequently, a battery pack according to a third embodiment will be explained with reference to the drawings. The battery pack comprises one or two or more of the above nonaqueous electrolyte batteries (unit cells) according to the second embodiment. When the battery pack includes two or more unit cells, these unit cells are disposed in such a manner that they are electrically connected in series or in parallel.

Figure 4:
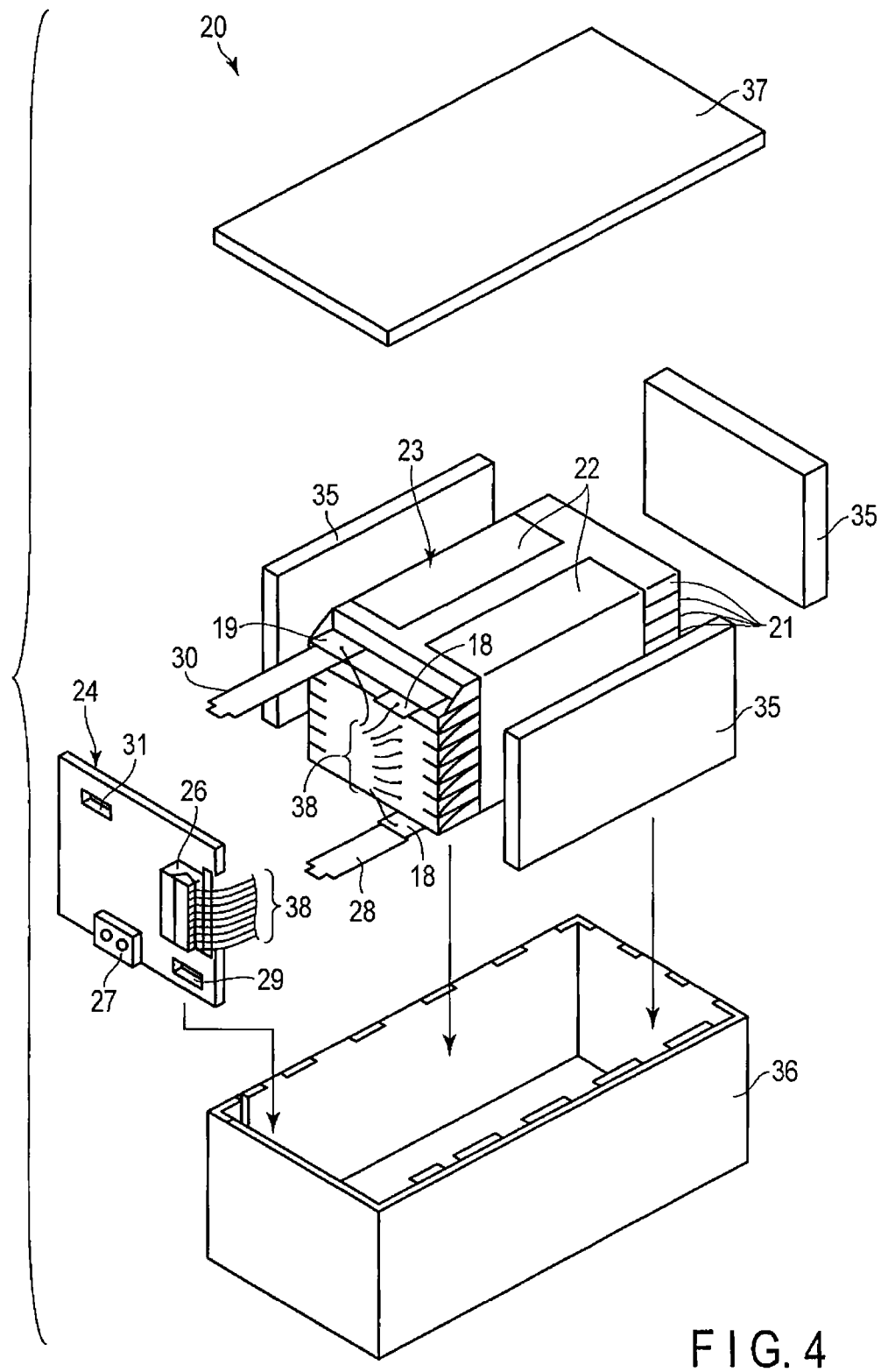
FIG. 4 is an exploded perspective view of a battery pack according to a third embodiment.

FIG. 4 and FIG. 5 show an example of a battery pack 20. This battery pack 20 comprises two or more flat-type unit cells 21. FIG. 4 is an exploded perspective view of the battery pack 20. FIG. 5 is a block pattern showing the electric circuit of the battery pack 20 shown in FIG. 4.

A plurality of unit cells 21 are laminated such that the externally extended positive electrode terminal 18 and negative electrode terminal 19 are arranged in the same direction and fastened with an adhesive tape 22 to thereby constitute a battery module 23. These unit cells 21 are electrically connected in series as shown in FIG. 5.

A printed wiring board 24 is disposed opposite to the side surface of the unit cell 21 from which the positive electrode terminal 18 and negative electrode terminal 19 are extended. As shown in FIG. 5, a thermistor 25, a protective circuit 26 and an energizing terminal 27 connected to external devices are mounted on the printed wiring board 24. An insulating plate (not shown) is attached to the surface of the printed wiring board 24 facing the battery module 23 to avoid unnecessary connection with the wiring of the battery module 23.

A positive electrode side lead 28 is connected to the positive electrode terminal 18 positioned on the lowermost layer of the battery module 23 and one end of the positive electrode side lead 28 is inserted into and electrically connected to a positive electrode side connector 29 of the printed wiring board 24. A negative electrode side lead 30 is connected to the negative electrode terminal 19 positioned on the uppermost layer of the battery module 23 and one end of the negative electrode side lead 30 is inserted into and electrically connected to a negative electrode side connector 31 of the printed wiring board 24. These connectors 29 and 31 are connected to the protective circuit 26 through wirings 32 and 33 formed on the printed wiring board 24.

The thermistor 25 is used to detect the temperature of the unit cell 21 and the detected signals are transmitted to the protective circuit 26. The protective circuit 26 can shut off a plus side wiring 34a and minus side wiring 34b between the protective circuit 26 and the energizing terminal 27 connected to external devices in a predetermined condition. The predetermined condition means, for example, the case where the temperature detected by the thermistor 25 exceeds a predetermined temperature. Alternatively, the predetermined condition indicates when the over-charge, over-discharge, and over-current of the unit cells 21 are detected. The detections of this overcharge and the like are performed for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIG. 4 and FIG. 5, a wiring 38 for detecting voltage is connected to each unit cell 21 and the detected signals are transmitted to the protective circuit 26 through these wirings 38.

The battery comprised in the battery pack of this embodiment is excellent in control of the potential of the positive electrode or the negative electrode by the cell voltage detection. Thus, a protective circuit which detects a cell voltage is preferably used.

A protective sheet 35 made of a rubber or resin is disposed on each of the three side surfaces of the battery module 23 excluding the side surface from which the positive electrode terminal 18 and negative electrode terminal 19 are projected.

The battery module 23 is accommodated in a container 36 together with each protective sheet 35 and printed wiring board 24. Specifically, the protective sheet 35 is disposed on each inside surface in the direction of the long side and on one of the inside surfaces in the direction of the short side of the container 36, and the printed wiring board 24 is disposed on the other inside surface in the direction of the short side. The battery module 23 is positioned in a space enclosed by the protective sheet 35 and the printed wiring board 24. A lid 37 is attached to the upper surface of the container 36.

In order to fix the battery module 23, a heat-shrinkable tape may be used in place of the adhesive tape 22. In this case, after the protective sheet is disposed on both sides of the battery module and the thermally contracting tubes are wound around the battery module; the thermally contracting tape is contracted by heating to fasten the battery module.

The structure in which the unit cells 21 are connected in series is shown in FIG. 4 and FIG. 5. However, these unit cells may be connected in parallel to increase the capacity of the battery. The assembled battery packs may be further connected in series or in parallel.

The structure of the battery pack is appropriately changed according to its use. The battery pack is preferably used in applications exhibiting excellent cycle performances when a large current is extracted. Specific examples of these applications include power sources for digital cameras, and power sources mounted on vehicles such as two- to four-wheel vehicles hybrid electric cars, two- to four-wheel electric cars and assist bicycles. The battery pack is preferably used for power sources mounted on vehicles.

According to the above embodiment, there can be provided a battery pack having improved input-output property.

EXAMPLES

Example 1

<Production of an Electrode>

The monoclinic β-type titanium composite oxide, carbon black, graphite, and polyvinylidene fluoride (PVdF) were dissolved in N-methylpyrrolidone (NMP) to prepare a slurry for producing an electrode. The monoclinic β-type titanium composite oxide, carbon black, graphite, and PVdF were compounded in a ratio of 100 parts by mass, 5 parts by mass, 2.5 parts by mass, and 7.5 parts by mass, respectively. The slurry was applied on both surfaces of a current collector made of aluminum foil, and then, dried and pressed.

In the monoclinic β-type titanium composite oxide used in this example, the average particle diameter of the primary particles and the average particle diameter of the agglomerated particles were 1 μm or less and about 10 μm, respectively.

The produced electrode was subjected to the XRD measurement using a Cu-Kα ray source. The measurement was performed as follows. When the electrode is taken out from the battery, the battery is first put into a discharge state. The discharge state is a state in which a battery is discharged, for example, until the battery reaches the recommended lower limit voltage of the battery. The electrode group is taken from the container in the discharge state under an inert atmosphere (e.g., argon atmosphere). The electrode group is disassembled to remove only an electrode. The removed electrode is cut into section having appropriate size so that the section fits a glass plate which is used for the measurement of the XRD pattern. The section is washed with, for example, a methylethyl carbonate solvent to dissolve Li salts and dried under reduced pressure to evaporate the solvent. Then, the section is attached to the glass plate and XRD measurement is performed.

The electrode according to Example 1 was subjected to XRD measurement described above. As a result, the ratio I(020)/I(001) was 0.9. The density of the active material layer of the electrode was 2.05 g/cm$^3$.

<Production of Evaluation Cell>

An evaluation cell was produced in dry argon. The electrode produced in the above manner was used as a working electrode and lithium metal was used as a counter electrode. They were opposed to each other via a glass filter (separator). The reference electrode made of lithium metal was inserted so as not to be in contact with the working electrode and the counter electrode.

The above members were placed in a three-electrode glass cell. The working electrode, the counter electrode, and the reference electrode were connected to a terminal of the glass cell, separately. An electrolytic solution was poured into the cell so as to fully impregnate the separator and the electrode with the electrolytic solution, and then, the glass container was sealed. As the solvent of the electrolytic solution, a mixed solvent prepared by mixing ethylene carbonate (EC) and diethyl carbonate (DEC) at a volume ratio of 1:2 was used. LiPF$_6$ was used for the electrolyte. The electrolytic solution was prepared by dissolving LiPF$_6$ in the mixed solvent at the concentration of 1.0 mol/L.

Example 2

An evaluation cell was produced in the same manner as described in Example 1 except that the press pressure was changed. The ratio I(020)/I(001) was 0.69. The density of the active material layer was 2.25 g/cm$^3$.

Example 3

An evaluation cell was produced in the same manner as described in Example 1 except that the press pressure was changed. The ratio I(020)/I(001) was 0.60. The density of the active material layer was 2.33 g/cm$^3$.

Example 4

An evaluation cell was produced in the same manner as described Example 1 except that the press pressure was changed. The ratio I(020)/I(001) was 1.17. The density of the active material layer was 1.23 g/cm$^3$.

Example 5

The monoclinic β-type titanium composite oxide, carbon black, graphite, carboxymethylcellulose (CMC), and styrene butadiene rubber (SBR) were dissolved in water to prepare a slurry for producing an electrode. The monoclinic β-type titanium composite oxide, carbon black, graphite, carboxymethylcellulose (CMC), and styrene butadiene rubber (SBR) were compounded in a ratio of 100 parts by mass, 5 parts by mass, 2.5 parts by mass, 3 parts by mass, and 3 parts by mass, respectively. The slurry was applied on both surfaces of a current collector made of aluminum foil, and then, dried and pressed. The CMC was used as a thickener.

The electrode according to Example 5 was subjected to XRD measurement described above. As a result, the ratio I(020)/I(001) was 0.71. The density of the active material layer of the electrode was 2.30 g/cm$^3$.

Example 6

An evaluation cell was produced in the same manner as described Example 5 except that the press pressure was changed. The ratio I(020)/I(001) was 0.61. The density of the active material layer was 2.50 g/cm$^3$.

Example 7

An evaluation cell was produced in the same manner as described Example 5 except that the press pressure was changed. The ratio I(020)/I(001) was 1.20. The density of the active material layer was 1.60 g/cm$^3$.

Comparative Example 1

An evaluation cell was produced in the same manner as described Example 5 except that the press pressure was changed. The ratio I(020)/I(001) was 0.52. The density of the active material layer was 2.43 g/cm$^3$.

Comparative Example 2

An evaluation cell was produced in the same manner as described Example 5 except that the press pressure was changed. The ratio I(020)/I(001) was 0.56. The density of the active material layer was 2.54 g/cm$^3$.

Example 8

An evaluation cell was produced in the same manner as described Example 1 except that the monoclinic β-type titanium composite oxide in the form of a primary particle having an average particle diameter of about 10 μm was used. The ratio I(020)/I(001) was 0.71. The density of the active material layer was 2.00 g/cm$^3$.

Example 9

An evaluation cell was produced in the same manner as described Example 8 except that the press pressure was changed. The ratio I(020)/I(001) was 1.02. The density of the active material layer was 1.30 g/cm$^3$.

Example 10

An evaluation cell was produced in the same manner as described Example 8 except that the press pressure was changed. The ratio I(020)/I(001) was 0.60. The density of the active material layer was 2.11 g/cm³.

Comparative Example 3

An evaluation cell was produced in the same manner as described Example 8 except that the press pressure was changed. The ratio I(020)/I(001) was 0.48. The density of the active material layer was 2.23 g/cm³.

<Charge and Discharge Test with Evaluation Cell>

The charge and discharge test was performed with the evaluation cell in an environment of 25° C. The discharge capacity was measured at 0.2 C and 3 C. The ratio of the 3 C discharge capacity to the 2 C discharge capacity was described in Table 1 as a 3 C/0.2 C capacity ratio (%). The cell was charged at 1 C. Here, the term "1 C" means the electric current value required to charge or discharge a capacity of 240 mAh/g per active material mass in 1 hour. The charge operation was performed at a constant current-constant voltage. When the voltage became 1.0 vs. Li/Li⁺, the charge was switched to the constant-voltage charge. When the electric current value became 0.05 C, the charge is terminated. The discharge operation was performed at a constant current. The discharge final voltage was set to 3.0 V (vs. Li/Li⁺). The 3 C discharge capacity (mAh/cm³) is shown in Table 1.

TABLE 1

|  | I(020)/I(001) | 3 C/0.2 C Capacity ratio (%) | density (g/cm³) | 3 C discharge capacity (mAh/cm³) |
|---|---|---|---|---|
| Example 1 | 0.90 | 71 | 2.05 | 349.3 |
| Example 2 | 0.69 | 69 | 2.25 | 372.6 |
| Example 3 | 0.60 | 66 | 2.33 | 369.1 |
| Example 4 | 1.17 | 69 | 1.23 | 203.7 |
| Example 5 | 0.71 | 71 | 2.30 | 391.9 |
| Example 6 | 0.61 | 68 | 2.50 | 408.0 |
| Example 7 | 1.20 | 70 | 1.60 | 268.8 |
| Example 8 | 0.71 | 65 | 2.00 | 312.0 |
| Example 9 | 1.02 | 67 | 1.30 | 209.0 |
| Example 10 | 0.60 | 61 | 2.11 | 308.9 |
| Comparative Example 1 | 0.52 | 55 | 2.43 | 320.8 |
| Comparative Example 2 | 0.56 | 56 | 2.54 | 341.4 |
| Comparative Example 3 | 0.48 | 49 | 2.23 | 262.2 |

The capacity ratios of Examples 1 to 4 were higher than that of Comparative Example 1. Therefore, like Examples 1 to 4, it is shown that when the peak reflection intensity ratio I(020)/I(001) is 0.6 or more, input-output property are excellent. On the other hand, Comparative Example 1 shows that the peak reflection intensity ratio I(020)/I(001) is as low as 0.52 and the plane (020) of the monoclinic β-type titanium composite oxide is decreased. From the above result it is considered that the insertion and release of lithium ion hardly occurred, and the capacity ratio was lowered.

In Examples 1 to 3, the discharge capacity per volume at 3 C was high as compared with Example 4 in which the density of the active material layer was less than 2.0 g/cm³. From the result, it was shown that when the density of the active material layer was 2.0 g/cm³ or more, a high energy density was obtained.

Although the density of the active material layer in Comparative Example 1 was 2.0 g/cm³ or more, the 3 C discharge capacity was low as compared with Example 3 in which the density of the active material layer was close to that of Comparative Example 1. This is because input-output property are poor due to the low level of the ratio I(020)/I(001).

The capacity ratios of Examples 5 to 7 were higher than that of Comparative Example 2. Therefore, like Examples 5 to 7, it is shown that when the peak reflection intensity ratio I(020)/I(001) is 0.6 or more, input-output property are excellent. On the other hand, Comparative Example 2 shows that the ratio I(020)/I(001) is as low as 0.56 and the plane (020) of the monoclinic β-type titanium composite oxide is decreased. From the above result it is considered that the insertion and release of lithium ion hardly occurred and the capacity ratio was lowered.

In Examples 5 to 6, the 3 C discharge capacity was high as compared with Example 7 in which the density of the active material layer was less than 2.0 g/cm³. From the result, it was shown that when the density of the active material layer was 2.0 g/cm³ or more, a high energy density was obtained.

Although the density of the active material layer in Comparative Example 2 was 2.0 g/cm³ or more, the 3 C discharge capacity was low as compared with Example 6 in which the density of the active material layer was equal to that of Comparative Example 2. This is because input-output property are poor due to the low level of the ratio I(020)/I(001).

In Examples 5 to 7 in which SBR was used as the binder, the density of the active material layer was high as compared with Examples 1 to 4 in which PVdF was used as the binder, even if they had an equal ratio I(020)/I(001). Therefore, it is shown that when SBR is used as the binder, the density of the active material layer can be increased while reducing an impact on the ratio I(020)/I(001).

The capacity ratios of Examples 8 to 10 were higher than that of Comparative Example 3. Therefore, it is shown that even when the monoclinic β-type titanium composite oxide in primary particle form is used, high input-output property are obtained because the ratio I(020)/I(001) is 0.6 or more.

In Examples 8 and 10, the 3 C discharge capacity was high as compared with Example 9 in which the density of the active material layer was less than 2.0 g/cm³. From the result, it was shown that when the density of the active material layer was 2.0 g/cm³ or more, a high energy density was obtained.

Although the density of the active material layer in Comparative Example 3 was 2.0 g/cm³ or more, the 3 C discharge capacity was low as compared with Example 10 in which the density of the active material layer was relatively close to that of Comparative Example 3. This is because input-output property are poor due to the low level of the ratio I(020)/I(001).

<Relationship Between Active Material Layer Density and Energy Density>

Figure 6:
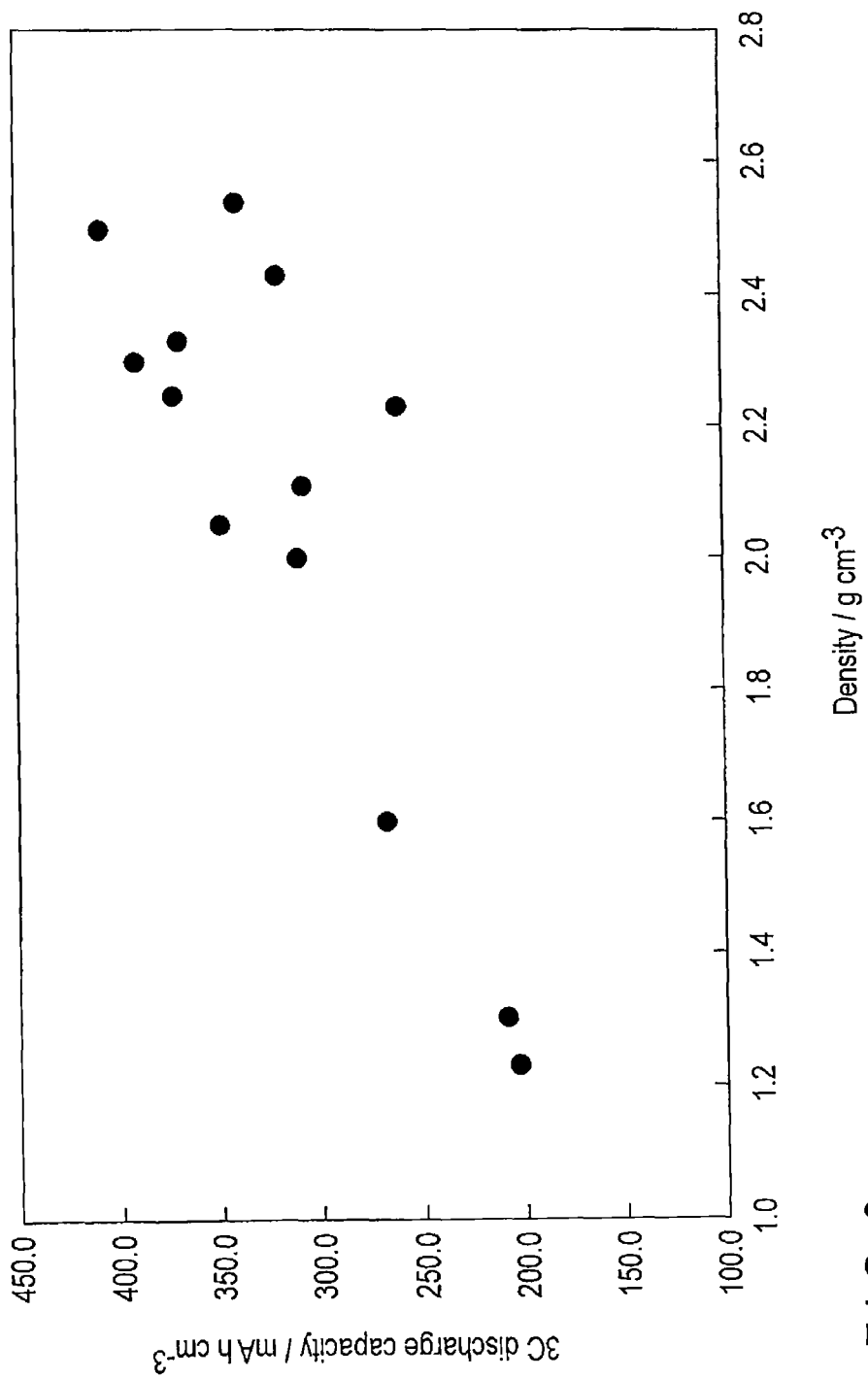
FIG. 6 is a graph showing the relationship between the electrode density and energy density of an active material layer.

A relationship among the densities of the active material layers of Examples 1 to 10 and Comparative examples 1 to 3 and the 3 C discharge capacity (mAh/cm³) is shown in FIG. 6. From FIG. 6, it is found that when the density of the active material layer is high, the 3 C discharge capacity tends to be high. Particularly, when the density of the active material layer is 2.0 g/cm³ or more and 2.5 g/cm³ or less, a high discharge capacity is obtained.

<Powder XRD Measurement>

Figure 7:
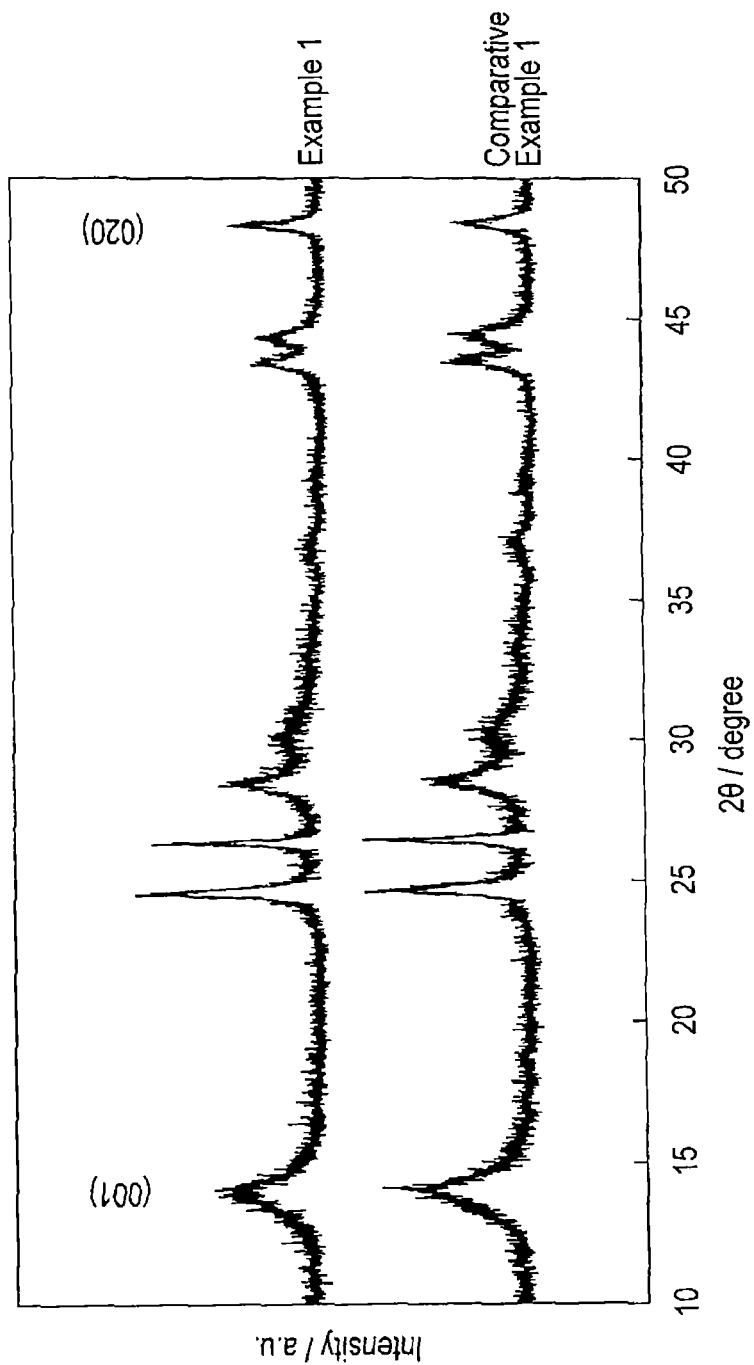
FIG. 7 is a view showing X-ray diffraction patterns of electrodes according to Example 1 and Comparative Example 1.

Powder XRD patterns of the electrode according to Example 1 and Comparative Example 1 are shown in FIG. 7. The measurement was performed using the Cu-Kα ray source in the above manner. In FIG. 7, the peak derived from the plane (020) appeared in a range from 48.0 to 49.0° and the peak derived from the plane (001) appeared in a range from 13.8 to 14.8°. The reflection intensity I(020) of the electrode according to Example 1 was higher than that of the electrode according to Comparative Example 1. Thus, the ratio I(020)/

I(001) of the electrode according to Example 1 was higher than that of the electrode according to Comparative Example 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
   a current collector; and
   an active material layer provided on the current collector,
   the active material layer comprising a monoclinic β-type titanium composite oxide,
   a ratio of a reflection intensity I(020) of a peak derived from a plane (020) of a crystal of the monoclinic β-type titanium composite oxide to a reflection intensity I(001) of a peak derived from a plane (001) of the crystal of the monoclinic β-type titanium composite oxide being in the range from 0.6 to 1.2 when the electrode is subjected to an X-ray diffraction measurement using a Cu-Kα ray source,
   wherein a density of the active material layer is in the range from 2.0 g/cm$^3$ to 2.5 g/cm$^3$.

2. The electrode according to claim 1, wherein the active material layer further comprises a styrene butadiene rubber.

3. A nonaqueous electrolyte battery comprising:
   an electrode according to claim 1 as a negative electrode;
   a positive electrode; and
   a nonaqueous electrolyte.

4. A nonaqueous electrolyte battery comprising:
   an electrode according to claim 2 as a negative electrode;
   a positive electrode; and
   a nonaqueous electrolyte.

5. A battery pack comprising:
   the nonaqueous electrolyte battery according to claim 3; and
   a container accommodating the battery.

6. A battery pack comprising:
   the nonaqueous electrolyte battery according to claim 4; and
   a container accommodating the battery.

7. The electrode according to claim 1, wherein the active material layer further comprises a conductive agent.

8. The electrode according to claim 7, wherein the conductive agent is scale-shaped graphite.

9. The electrode according to claim 1, wherein the monoclinic β-type titanium composite oxide has a specific surface area in the range from 5 m$^2$/g to 100 m$^2$/g.

10. The electrode according to claim 9, wherein the monoclinic β-type titanium composite oxide has a specific surface area in the range from 10 m$^2$/g to 20 m$^2$/g.

11. The electrode according to claim 1, wherein:
    the active material layer further comprises a conductive agent which is scale-shaped graphite; and
    the monoclinic α-type titanium composite oxide has a specific surface area in the range from 5 m$^2$/g to 100 m$^2$/g.

12. The electrode according to claim 11, wherein:
    the active material layer further comprises a styrene butadiene rubber.

13. The electrode according to claim 1, wherein the electrode has been compressed.

* * * * *